A. Wheeler. Countersink Gauge.
116901
Fig. 2.
PATENTED JUL 11 1871
Fig. 3.
Fig. 1.
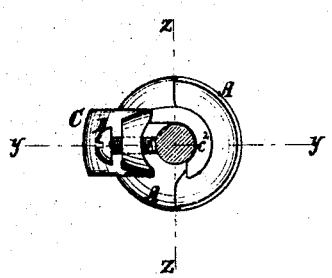
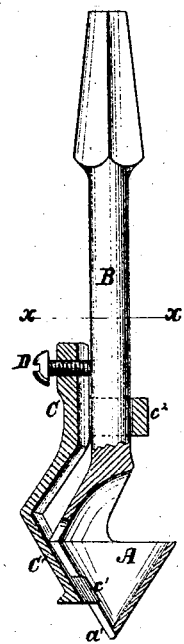
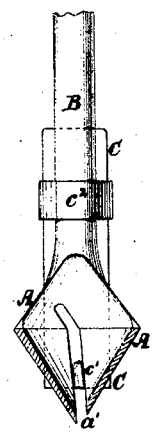
Witnesses:
A Bennerendorf
Wm H. C. Smith.
Inventor:
A. Wheeler.
PER
Attorneys.

UNITED STATES PATENT OFFICE.

ASA WHEELER, OF BRATTLEBOROUGH, VERMONT, ASSIGNOR TO G. B. WHEELER, OF SAME PLACE.

IMPROVEMENT IN GAUGES FOR COUNTERSINKS.

Specification forming part of Letters Patent No. 116,901, dated July 11, 1871.

*To all whom it may concern:*

Be it known that I, ASA WHEELER, of Brattleborough, in the county of Windham and State of Vermont, have invented a new and useful Improvement in Countersink-Gauge; and I do hereby declare that the following is a full, clear, and exact description thereof, which will enable others skilled in the art to make and use the same, reference being had to the accompanying drawing forming part of this specification, in which—

Figure 1 is a top view of my improved gauge, the countersink-shank being cut off through the line $x\,x$, Fig. 2. Fig. 2 is a side view, partly in section, through the line $y\,y$, Fig. 1. Fig. 3 is a side view, partly in section, through the line $z\,z$, Fig. 1.

Similar letters of reference indicate corresponding parts.

My invention has for its object to furnish an improved gauge for attachment to Wheeler's patent countersink, which shall be simple in construction, convenient in use, easily attached to the countersink, and which will always stop the countersink at exactly the desired point; and it consists in the gauge constructed, as hereinafter more fully described, to adapt it for attachment to the countersink.

A is the conical countersink, having a slot, $a'$, formed in one side, and one edge of which slot forms the cutting-edge of the countersink. B is the shank of the countersink, upon the lower end of which is formed the conical cutter A. C is the gauge, which is formed angling, as shown in Fig. 2, so that its lower part may fit upon the side of the conical cutter A. The lower end of the gauge C is made broad, and upon the inner side of said lower end is formed a projection, $c^1$, which passes through the slot $a'$ and keeps the gauge in place upon the cutter A. The stem of the gauge C extends up along the shank B and has a hook, $c^2$, formed upon it, which passes around the shank B, as shown in Figs. 1, 2, and 3. The gauge C is secured in place, when adjusted, by a set-screw, D, which passes in through a screw-hole in the upper end of the gauge C, and the forward end of which rests against the side of the shank B, as shown in Figs. 1 and 2. By this construction, by simply loosening the screw D the gauge C can be easily and quickly adjusted as required, or the gauge can be detached from the countersink.

Having thus described my invention, I claim as new and desire to secure by Letters Patent—

The adjustable gauge C $c^1$ $c^2$ D, constructed substantially as herein shown and described, in combination with a countersink, A $a'$ B, as and for the purpose set forth.

ASA WHEELER.

Witnesses:
F. TYLER,
WILLIAM S. NEWTON.